(12) United States Patent
Reed (10) Patent No.: US 9,660,739 B2
(45) Date of Patent: May 23, 2017

(54) SYSTEM AND METHODS OF TESTING ADAPTIVE ANTENNAS

(71) Applicant: Spirent Communications, Inc., Sunnyvale, CA (US)

(72) Inventor: John Douglas Reed, Arlington, TX (US)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

(21) Appl. No.: 15/015,037

(22) Filed: Feb. 3, 2016

(65) Prior Publication Data
US 2016/0233970 A1    Aug. 11, 2016

Related U.S. Application Data

(60) Provisional application No. 62/249,838, filed on Nov. 2, 2015, provisional application No. 62/114,044, filed on Feb. 9, 2015.

(51) Int. Cl.
*H04B 17/16* (2015.01)
*H04B 17/29* (2015.01)
(Continued)

(52) U.S. Cl.
CPC ......... *H04B 17/29* (2015.01); *H04B 17/0087* (2013.01); *H04B 17/12* (2015.01); *H04B 17/16* (2015.01)

(58) Field of Classification Search
CPC ........ H04B 17/15; H04B 17/16; H04B 17/29; H04B 17/309; H04B 17/318; H04B 17/327; H04B 17/336; H04B 17/373
(Continued)

(56) References Cited

U.S. PATENT DOCUMENTS

| 5,548,820 A | 8/1996 | Victorin |
| 6,236,363 B1 | 5/2001 | Robbins et al. |

(Continued)

FOREIGN PATENT DOCUMENTS

CN    EP 2533572 A1 * 12/2012 ......... H04L 41/0823

OTHER PUBLICATIONS

PCT/US2010/024204—International Search Report and Written Opinion mailed Aug. 2, 2010 10 pp.
(Continued)

*Primary Examiner* — Siu Lee
(74) *Attorney, Agent, or Firm* — Haynes Beffel & Wolfeld LLP; Ernest J. Beffel, Jr.

(57) ABSTRACT

The technology disclosed relates to systems and methods for testing adaptive antennas via a multi-probe anechoic chamber, which includes the emulation of real world conditions of a radio frequency (RF) signal reaching a device-under-test (DUT). The technology disclosed can be applied to test and evaluate a range of changed conditions. In one case, beamforming scenarios use separate spatial desired and interference signals, and the results can be compared to uniform interference. Based on performance for a segment of a test profile, the segment can be modified or expanded: shortened, repeated, or repeated with a modification—to fully evaluate the aspect being tested. Also, a dynamic profile that is utilized to evaluate a first device can be saved and repeated as a fixed profile for further testing of a first or second device.

24 Claims, 7 Drawing Sheets

Example System for Testing Adaptive Antennas (51) Int. Cl.
H04B 17/00 (2015.01)
H04B 17/12 (2015.01)

(58) Field of Classification Search
USPC .............................. 375/224, 225, 227, 228
See application file for complete search history.

(56) References Cited

U.S. PATENT DOCUMENTS

| | | | |
|---|---|---|---|
| 6,349,218 B1 | 2/2002 | Nakagawa et al. | |
| 6,571,082 B1 | 5/2003 | Rahman et al. | |
| 6,952,455 B1 | 10/2005 | Banister | |
| 7,508,868 B2 | 3/2009 | Chang | |
| 7,715,844 B2 | 5/2010 | Bi et al. | |
| 8,412,112 B2 | 4/2013 | Foegelle | |
| 8,793,093 B2 | 7/2014 | Mow et al. | |
| 8,824,588 B2* | 9/2014 | Emmanuel | H04B 17/10 375/224 |
| 8,912,963 B2* | 12/2014 | Mow | H04B 17/0087 343/703 |
| 9,107,098 B2* | 8/2015 | Emmanuel | H04W 24/06 |
| 9,246,607 B2* | 1/2016 | Reed | H04B 17/21 |
| 2003/0050020 A1 | 3/2003 | Erceg et al. | |
| 2003/0124982 A1 | 7/2003 | Saari et al. | |
| 2004/0259554 A1 | 12/2004 | Rappaport et al. | |
| 2006/0229020 A1 | 10/2006 | Mlinarsky et al. | |
| 2007/0243826 A1 | 10/2007 | Liu | |
| 2008/0056340 A1* | 3/2008 | Foegelle | H04B 17/0082 375/224 |
| 2008/0139195 A1 | 6/2008 | Marsyla et al. | |
| 2009/0094492 A1 | 4/2009 | Music et al. | |
| 2010/0177813 A1* | 7/2010 | Gessner | H04B 17/24 375/225 |
| 2010/0285753 A1* | 11/2010 | Foegelle | H04B 17/21 455/67.12 |
| 2011/0084887 A1 | 4/2011 | Mow et al. | |
| 2011/0299570 A1 | 12/2011 | Reed | |
| 2012/0098713 A1 | 4/2012 | Mow et al. | |
| 2012/0225624 A1 | 9/2012 | Kyosti et al. | |
| 2012/0282863 A1 | 11/2012 | Guo et al. | |
| 2015/0017928 A1* | 1/2015 | Griesing | H04B 17/0085 455/67.14 |
| 2016/0226709 A1* | 8/2016 | Chen | G01R 29/105 |

OTHER PUBLICATIONS

U.S. Appl. No. 13/147,579—Notice of Allowance mailed Nov. 24, 2014, 6 pp.
U.S. Appl. No. 13/147,579—Office Action mailed Mar. 13, 2014, 17 pp.
U.S. Appl. No. 13/147,579—Response to Office Action mailed Mar. 13, 2014 filed Aug. 13, 2014, 13 pp.
U.S. Appl. No. 14/801,746—Office Action dated Jun. 28, 2016, 12 pp.
Rumney, Moray, "LTE and the Evolution to 4G Wireless: Design and Measurement Challenges," Agilent Technologies Publication, 2009, pp. 199-411.
"Moving Forward to What's Possible in LTE," Agilent Technologies, Inc., Mar. 16, 2009, pp. 1-12, accessed at http://www.agilent.com/find/lte.
"Agilent 3GPP Long Term Evolution: System Overview, Product Development, and Test Challenges," Application Note, Agilent Technologies, Inc., Sep. 8, 2009, pp. 1-92, accessed at http://www.agilent.com/find/LTE.
"E6620 Wireless Communications Test Set," Agilent Technologies, Inc., Jun. 8, 2009, pp. 1-12, accessed at http://www.agilent.com/find/8960devicedesign.
Technical White Paper, "Long Term Evolution (LTE): A Technical Overview," Motorola, Inc., 2007, pp. 1-15, accessed at www.motorola.com.
Narandzic, Milan et al., "Comparison of SCM, SCME, and WINNER Channel Models," IEEE, 2007, pp. 413-417.
Berger, Lars T., et al., "Geometry Based Other-Sector Interference Modelling for Downlink Systme Simulations", 2004, 5 pages.
Baum, Daniel S., et al., "An Interim Channel Model for Beyond-3G Systems", 2005, 5 pages.
Cito_"Test Plan for 2x2 Downlink MIMO and Transmit Diversity Over-the-Air Performance", Aug. 2015, 75 pages.
Huang, Kaibin, et al., "Spacial Interference Cancellation for Mulitantenna Mobile Ad Hoc Networks", Mar. 2012, 17pages.

* cited by examiner

FIG. 1 Example System for Testing Adaptive Antennas

Fig. 6 Computer System

FIG. 7 Example of Dynamically Modifying a Test Profile

_US 9,660,739 B2_

SYSTEM AND METHODS OF TESTING ADAPTIVE ANTENNAS

PRIORITY APPLICATIONS

This application is related to and claims the benefit of U.S. Provisional Patent Application 62/249,838, entitled, "SYSTEM AND METHODS OF TESTING ADAPTIVE ANTENNAS," filed on Nov. 2, 2015 and U.S. Provisional Patent Application 62/114,044, entitled, "SYSTEM AND METHODS OF TESTING ADAPTIVE ANTENNAS," filed on Feb. 9, 2015. The provisional applications are hereby incorporated by reference for all purposes.

RELATED APPLICATIONS

This application is related to and incorporates by reference U.S. patent application Ser. No. 14/801,746, filed on Jul. 16, 2015 entitled "Massive MIMO Array Emulation". This related application is bodily included in the later priority provisional application.

This application is related to and incorporates by reference U.S. application Ser. No. 13/753,138, filed on Jan. 29, 2013 entitled "Three Dimensional Over the Air Antenna Performance Evaluation," which claims priority to Provisional Application No. 61/644,984, filed on May 9, 2012. This related application is hereby incorporated by reference for all purposes.

BACKGROUND

The technology disclosed relates to systems and methods for testing adaptive antennas via a multi-probe anechoic chamber.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Multiple-Input-Multiple-Output (MIMO) antenna techniques are a key factor in achieving the high data rates promised by next-generation wireless technologies such as LTE and LTE-Advanced. In addition to the challenges these new techniques impose on the design and execution phases of wireless products, MIMO adds several new wrinkles to RF testing. One area that experiences a renewed sense of importance with MIMO is the topic of Over-the-Air (OTA) device testing.

Under ideal conditions an M×N MIMO system (one using M transmitting antenna elements and N receiving antenna elements) can increase maximum data rates by a factor of min{M,N} times those available from a Single-Input Single-output (SISO) system operating in the same bandwidth. In other words, a 4×2 MIMO system can (under ideal conditions) double the data rates available in a SISO implementation, while a 4×4 MIMO system might quadruple those rates. However, the real-world environment is not only far from ideal, it is far from static.

Most traditional SISO device testing is performed with a conducted signal. Test equipment is literally cabled to the transceiver of the device under test (DUT) by means of a temporary antenna connector, which effectively bypasses the device antennas. Supplementary SISO OTA tests are run in an anechoic chamber to characterize the antenna performance. These tests use two figures of merit to quantify antenna performance: Total Radiated Power (TRP) and Total Receiver Sensitivity (TRS, also known as Total Isotropic Sensitivity [TIS] by the CTIA). However, the results of OTA testing have been considered of secondary importance compared to conducted testing results.

One discussion of LTE testing from Agilent is by Rumney, "3GPP LTE Standards Update: Release 11, 12 and Beyond", (uploaded to SlideShare Feb. 10, 2013) accessed at <http://www.slideshare.net/zahidtg/3gpp-lte-standards-update-release-11-12-and-beyond>.

An opportunity arises to provide new and improved systems and methods for testing adaptive antennas via a multi-probe anechoic chamber.

SUMMARY

The technology disclosed relates to systems and methods for testing adaptive antennas via a multi-probe anechoic chamber, which includes the emulation of real world conditions of a radio frequency (RF) signal reaching a device-under-test (DUT).

Multi-probe anechoic chamber based over the air (OTA) techniques are well known for the evaluation of antennas at the UE. Using the disclosed technology, when the device under test (DUT) includes adaptive antennas, the multi-probe technique can be extended to measuring adaptive antennas. In an example beamforming scenario, separate spatial desired and interference signals can be used, and the results can be compared to uniform interference.

The technology disclosed can be applied to test and evaluate a range of changed conditions, described below. In one case, beamforming scenarios use separate spatial desired and interference signals, and the results can be compared to uniform interference. Based on performance for a segment of a test profile, the segment can be modified or expanded: shortened, repeated, or repeated with a modification—to fully evaluate the aspect being tested. Also, a dynamic profile that is utilized to evaluate a first device can be saved and repeated as a fixed profile for further testing of a first or second device.

Particular aspects of the technology disclosed are described in the claims, specification and drawings.

DETAILED DESCRIPTION

The following detailed description is made with reference to the figures. Preferred embodiments are described to illustrate the technology disclosed, not to limit its scope, which is defined by the claims. Those of ordinary skill in the art will recognize a variety of equivalent variations on the description that follows.

The technology disclosed addresses a new challenge of quantifying the performance of adaptive antennas. Tests of mobile devices (DUTs) have not previously focused on active adaptation of antennas because these antennas have not yet reached the market.

The incumbent approach is insufficient when working with new designs of antennas in MIMO systems. MIMO device performance is especially sensitive to a variety of factors including propagation environment, antenna design/orientation and baseband algorithms. Modern channel emulators can deliver realistic conducted signals to MIMO devices, but the act of cabling to the antenna ports impacts the effects of some of these factors.

MIMO systems are designed to take advantage of spatial diversity available in the propagation environment. The spatial diversity is quantified by the correlation between antennas, a function of both the propagation environment and the antenna patterns. Since antenna design and orientation are critical in MIMO systems, MIMO device evaluation is incomplete without the inclusion of antenna effects under realistic propagation conditions. This requires an OTA test method.

While TRP and TRS are useful figures of merit when evaluating SISO devices, MIMO performance is a function of so many disparate factors that it must be evaluated in a slightly different way. The figure of merit most commonly used to differentiate between a "good" and "poor" MIMO device is data throughput, measured under realistic environment conditions.

A useful MIMO OTA testing method needs to emulate the propagation environment seen in real-world network deployment. In the context of a relatively wide-bandwidth technology like LTE, it is important to emulate the spatial aspects of the wireless channel.

For a MIMO receiver, both the angle at which the signals arrive at the DUT (known as Angle of Arrival and abbreviated to AoA) and the angle spread (AS) are significant and should be modeled by the system. It is also important to model the Angle of Departure (AoD) of the transmitted signals, since this also influences the throughput of the MIMO channel. A multipath component does not arrive at the DUT from uniformly distributed directions. Instead, each is spatially concentrated, resulting in a particular angle spread and a unique angle of arrival.

Since each path can have a unique AS and a unique AoA, the mobility (direction and speed of travel) of the user produces a unique Doppler spectrum for each path. While the composite-environment Doppler spread may resemble the U-shaped spread seen in narrow-band channels, the per-path Doppler spread will retain their wideband characteristics. The effects of these antenna pattern parameters dictate the correlation between device antennas, and must be accounted for in the MIMO OTA method.

Some very useful, cost-effective MIMO-OTA testing can be performed with a combination of channel emulators and a reverberation chamber, which allows reflections to propagate within the chamber. More detailed testing can be performed using channel emulators and an anechoic chamber, which allows the generated field to be completely controlled by the channel emulator, an arrangement which enables better spatial fine-tuning.

The ring of probes in MIMO OTA can include spatial interference signals. When modeling spatial interference, the goal is to establish some level of signal to interference ratio (SIR) to evaluate device performance. Anechoic-based MIMO OTA methods provide a means of accurately emulating the spatial aspects of a wireless channel in a controlled and repeatable manner.

Many different changes in channel conditions can trigger adaptations of an adaptive antenna system in a DUT. Some changed conditions can trigger a change in the physical configuration of adaptive antennas and others can trigger a change in processing of signals collected from the antennas. For instance, pin diodes can be used to change the grounding point of an inverted F antenna, which changes the physical geometry of the antenna; or the phase relationship between adjoining DUT antennas can be inverted. For most purposes of this disclosure, the mode of antenna adaptation is treated as a black box, though there will be conditions under which the mode of adaptation could be inferred from measured performance. Moreover, a device manufacturer can cause a DUT to log internal state information or other operating parameters that would be helpful for development or debugging purposes. The log could be received from the DUT in contemporaneous, incremental reports or compiled and reported at the end of a test.

The technology disclosed can be applied to test and evaluate a range of changed conditions. We describe sixteen of these test and evaluation setups next.

We can sweep or step the AoA of the spatial signal to evaluate the ability of the adaptive antenna to track and optimize the SNR of the desired signal. We can sweep or step the AoA of the spatial interferer to evaluate the ability of the antenna to reject the interferer when receiving a sufficient desired signal. We can sweep the desired signal with respect to the interfering signal so that the delta angle between desired and interference signals changes, to test the adaptive antenna correction as the effective interference changes.

In another scenario, we can modify the ratio of the desired and interference signal to test the ability of the adaptive antenna to receive the desired and reject the interference source. By adding or subtracting desired signal angles of arrival, at the same or different power levels, we can emulate a multipath environment. Similarly, we can add or subtract interference signal angles of arrival at the same or different power levels to emulate a multipath environment. Alternatively, we can adapt the speed of the changing environment to stress the response time of the adaptive antenna; and we can adapt the number and location of the multipath components, including the desired and interfering components, to evaluate the ability of the adaptive antenna algorithm to optimize for the given conditions (including the concept of a birth-death process).

In some test and evaluation setups, results for each environment condition are evaluated for a predetermined time and recorded as part of a figure of merit. In other setups, test times for each test condition may be defined as a function of the channel condition and may be selected in order to allow the mobile device (UE, short for User Equipment) time to adapt to each condition in the profile of test conditions evaluated during the test call. Later post processing may utilize a different time segment for each condition to determine a second figure of merit. In other setups, tests may include head, hand, or other phantoms, wherein the direction of the desired and interfering signals are selected with respect to the phantoms so that the operation and evaluation of the adaptive antenna includes the presence and relative location of the phantoms.

Using another setup, a playback scheme enables test signals that are recorded by field measurements to be conditioned and played back in the chamber to reproduce the dynamically changing environment observed in real scenarios in order to measure the ability of the adaptive antenna to optimize its performance in such an environment.

Some test and evaluation setups include creating a test environment that includes a UE with an adaptive antenna, wherein additional emulated UEs are added as an additional load on the network, in order to enable features including frequency selective scheduling and resource allocation to be actively running while the test UE is evaluated for performance of the adaptive antenna.

Another method includes the emulation of changing the velocity and direction of the emulated device, which may be associated with the direction of arrival of the desired and/or undesired components, such as modeling a street canyon, or modeling the handoff between two eNodeBs (hardware connected to the mobile device network for communicating directly with UEs).

Another setup creates a test environment having spatially diverse paths that are configured to support coordinated multipoint (COMP) and MIMO connections to multiple nodes, to evaluate the ability of multiple UE antennas to adapt simultaneously to different sources. Yet another test and evaluation setup includes testing a UE having more than one adaptive antenna algorithm with the same dynamically changing environment in order to measure the performance difference between adaptive algorithms.

Other parameters that can be addressed by adaptive antenna testing, using the technology disclosed include modeling a dynamic traffic condition in which the UE adaptive antennas are evaluated with variable traffic.

The DUT/UE orientation may be fixed, stepped, or moving to allow the evaluation of the adaptive antenna. A mechanical turntable and/or arm can be used to modify the orientation of the device. In one example, a DUT/UE can be evaluated at specific orientation angles using a throughput target search to determine the signal or signal to interference ratio (SIR) level needed to obtain a predefined performance.

Multiple UE orientations may be measured as part of a test; and we can add additional carriers to consider the behavior of carrier aggregation to the ability of the adaptive antenna. A test can include different SISO and MIMO transmission modes, and can include self-interference from the UE, along with interference from other radio access technologies (RATs), including WiFi, Bluetooth, etc., when desired. Tests also include inter-RAT handoffs.

A disclosed method of evaluation includes AoAs being distributed in azimuth and/or elevation, so that 2D or 3D environments are included. Tests include the emulation of a second or third eNodeB and the modeling of a handoff process.

Tests for latency of call initiation and for the adaptation latency to changed conditions are included, as well as testing the UE at one or more of the following scenarios: physical (PHY) layer, data link layer, network layer, transport layer, session layer, presentation layer, application layer, UDP, TCP/IP, etc.

The above test conditions are written in terms of the downlink, however the uplink may be modeled, as well as the bi-directional case where uplink and downlink spatial models operate simultaneously with the appropriate correlation between uplink and downlink models applied. Other parameters that can be addressed by adaptive antenna testing include dynamic spatial models that enable other Rel-12, 13, and 5G features not listed here.

In the following sections, some of these test conditions are explained and related to illustrative figures.

Figure 1:
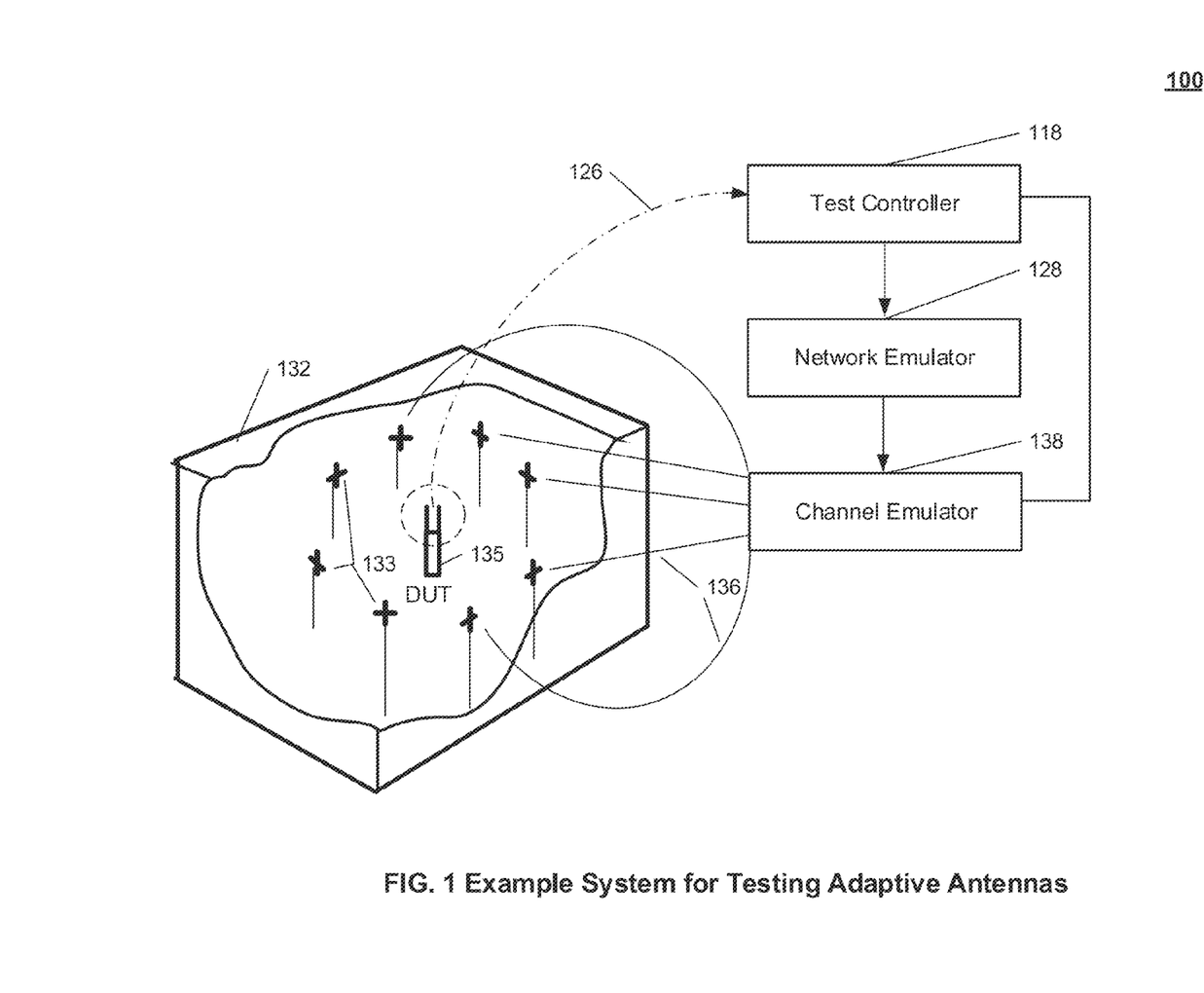
FIG. 1 is an example system used to emulate RF signals and test received signals from a device under test.

FIG. 1 includes a test controller 118 that receives quantified performance data from a DUT 135, which is located inside an anechoic test chamber 132. The DUT has an adaptive antenna system that actively adapts antenna configuration, signal processing or both. Network emulator 128 delivers simulated communication data to channel emulator 138. The channel emulator produces signals 136 that feed the multiple simulated antennas 133. Note that not all RF connections are shown in FIG. 1.

Using an anechoic test chamber 132 with multiple antennas 133, the angles of arrival of the multiple paths described by a channel model or field recorded channel parameters can be emulated by applying power weightings to each path and probe from a ring of probes within an anechoic chamber, to the DUT. Multiple angles of arrival can be emulated from antennas by varying properties of the RF source. By distributing the RF transmission power to emulate a set of incoming planewaves, a spatial channel is produced. The angle of arrival can be emulated by the weighted signals using a number of antennas available, consistent with treating the DUT as a black box. While a single antenna black box could be predicted to coherently combine signals from adjoining antenna into a single planewave, multiple antennas can have different geometric relationships to adjoining antennas with differing delay parameters. The system can compensate for lack of information about the DUT antennas configuration, by applying slightly different Doppler shifts to adjoining antennas, whereby it is ensured that the signals from adjoining transmission antennas will combine at the DUT receiving antennas by average power instead of coherently. For a moving DUT, such as one in a car or train, different Doppler shifts will be appropriate for the different multi-paths of a signal. Both Doppler shifted and non-shifted tests can be run.

The DUT 135 is evaluated in a test volume or effective test cavity. It interacts with the emulated spatial channel. The DUT 135 is capable of adapting its antennas or signal processing, so it adapts to the signal conditions that it observes. This adaptation takes a finite amount of time, which may vary along with its accuracy under various signal conditions. If the signal to noise ratio is low, for instance, then adaptation may be more difficult and may take an extended time. A variety of test conditions are emulated so that the adaptation of the antennas within the device under test can be evaluated.

Figure 2:
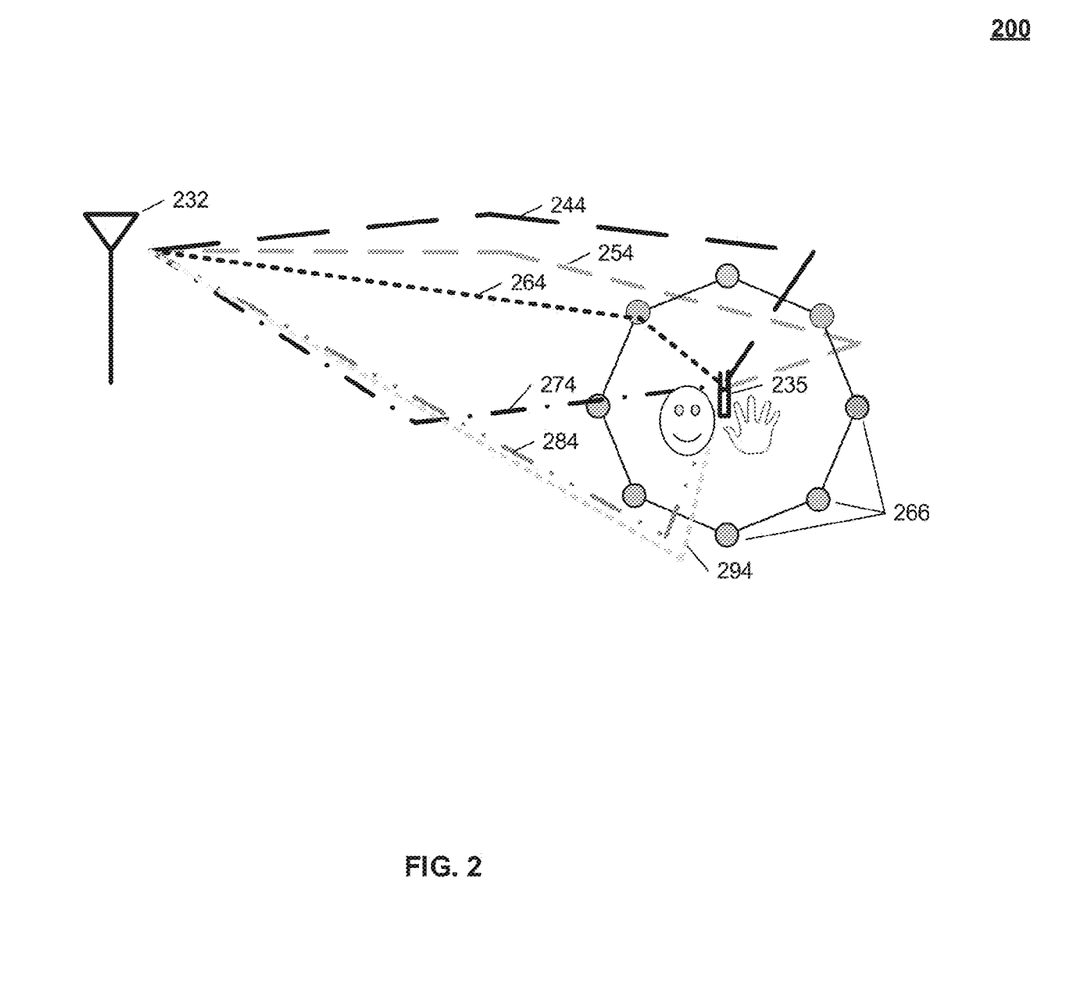
FIG. 2 shows an example set of signals from a desired source to a device under test, with multi-pathing emulated by an array of antennas.

FIG. 2 shows an example virtual antenna array 232 that provide signals to a DUT 235. Six so-called multi-paths 244, 254, 264, 274, 284, 294 are shown, which represent a radio channel between the virtual base station and the DUT. For signal multi-paths 244, 254 two reflection points occur on their paths to the DUT 235; for signal multi-paths 264, 274, 284, 294 a single reflection point occurs before each signal arrives at the DUT 235. Each of the emulated multi-path signals are transmitted by weighted power levels at specific delays on the ring of probes of antenna array 266 to create a spatial environment represented by the channel model for evaluating the DUT. Not shown is the line of sight path directly from the antenna to the DUT. Spatial models reflect multi-pathing by specifying a distribution of angles of arrival under various environmental conditions. In addition, recordings can capture angle of arrival, delay and signal strength parameters experienced along a particular drive path, as an alternative to generating environmental parameters from a model. Using data one source or the other, a distribution of multi-pathed signals among antenna array 232, signals at the DUT are modified.

The transmitter antenna geometry of an antenna array 232 is referenced to the direction of a center position of the DUT 235 and each signal path is described by its spatial and temporal properties as defined by the channel model that is being emulated.

In one implementation, the antenna array 266 includes eight antennas, transmitting a model of the signals from the virtual antenna array 232, as shown in FIG. 2. Each antenna can include two orthogonal antenna elements, as indicated by a +. A first antenna element of the two orthogonal antenna elements can be a vertical antenna element, and a second antenna element of the two orthogonal antenna elements can be a horizontal antenna element, or vice versa. This supports the modeling of plane wave polarization of the transmitted signals. In simpler implementations, only one antenna element would be included, such as a vertical or horizontal element. In general, each antenna can include one or more vertical element, and/or one or more horizontal element. First antenna elements at the perimeter antenna locations can be aligned with each other. Similarly, second antenna elements at the perimeter antenna locations can be aligned with each other. Each antenna can also include other elements not parallel to the vertical element or not parallel to the horizontal element.

The number of antennas impacts a sweet spot for testing the DUT 235 at the center of the antenna array. It is estimated that eight antennas produce an effective test cavity of 0.8 lambda that is omnidirectional. For a 2.4 GHz signal the wavelength is 12.5 cm, and 0.8 lambda is 10 cm. More antennas increase the effective test cavity or volume. For instance, 16 antennas produce an estimated effective test cavity of 2.0 lambda. For higher frequency communications, such as 3.5 GHz, the effective test cavity shrinks with the wavelength, so 16 or 32 antennas can be used to produce an omnidirectional test cavity that covers the form factor of a laptop or large tablet. An omnidirectional test cavity is desirable to emulate multi-pathed signals that are modeled from arbitrary angles of arrival. Although 8, 16, and 32 antennas are mentioned, other numbers can be used. Ranges of numbers of antennas apply, including 8 to 16, 8 to 32, 8 to 64, 16 to 32, 16 to 64, and 32 to 64 antennas. More antennas could be used, but are not likely to be needed unless a hemisphere or sphere arrangement is applied, as the assignee has done for GPS systems.

In FIG. 2, moving one or more RF sources of the spatial signal transmitted to the DUT among antenna array 266 forces the DUT to track the arrival direction and allows evaluation of the DUT's tracking. As a first order approach to changing angles, a rotating turn table could be used, but this approach uniformly rotates all paths emulated in the spatial environment. This is not realistic, as mobile devices experience a change in differences between paths arrival as the devices move.

Figure 3:
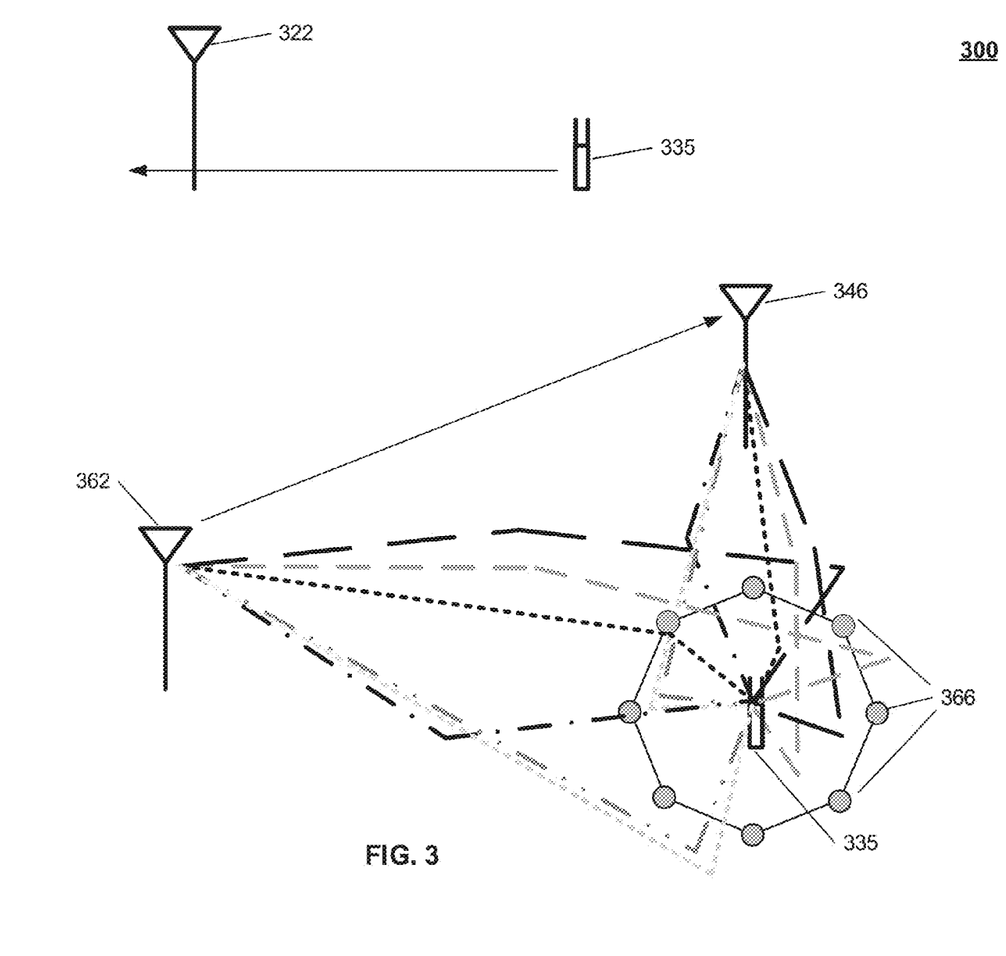
FIG. 3 illustrates simple movement of the mobile device relative to a desired signal source, such as a cell phone in a car driving past an antenna.
Figure 4:
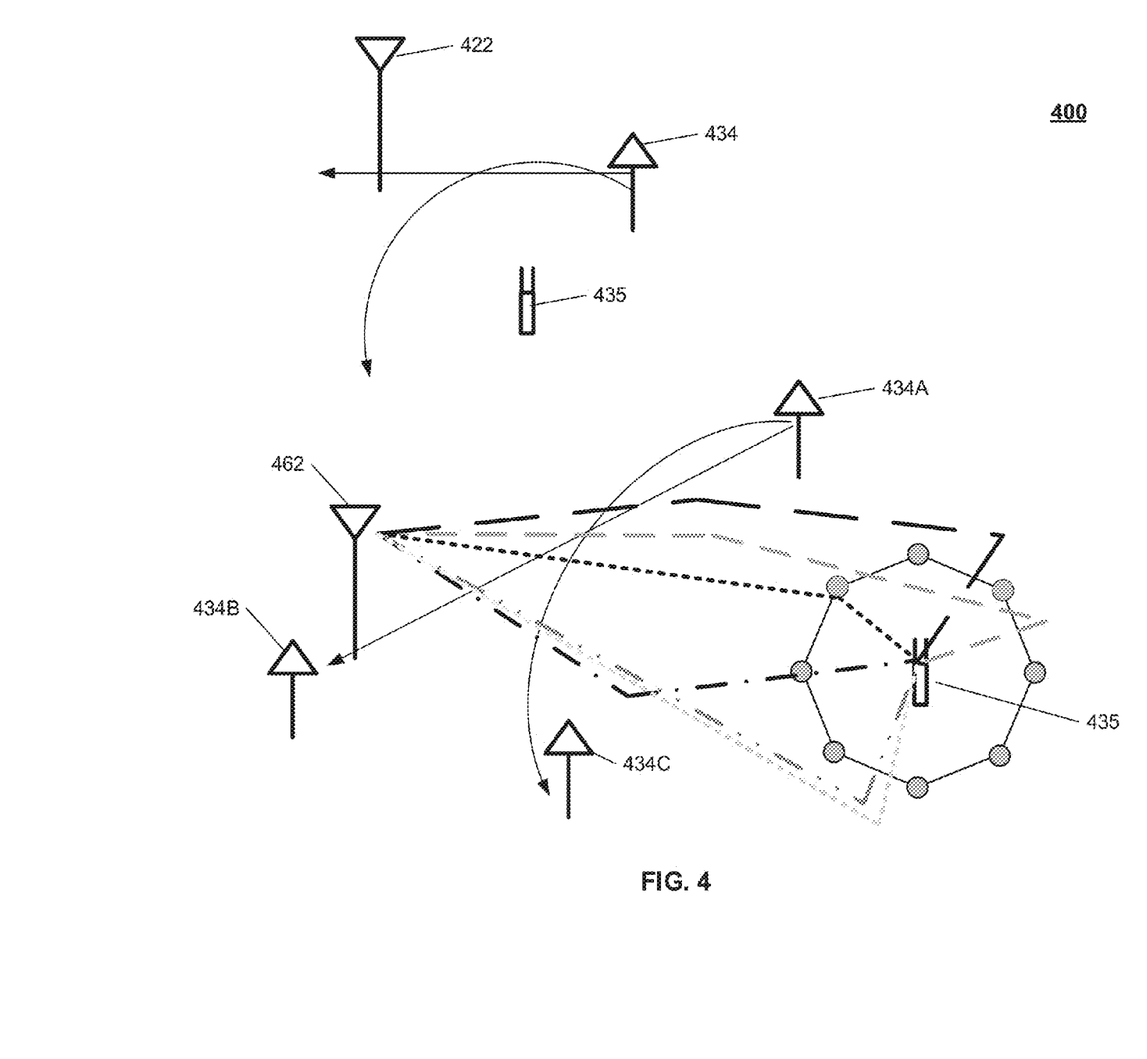
FIG. 4 shows relative positions of a moving interferer and a signal source.
Figure 5:
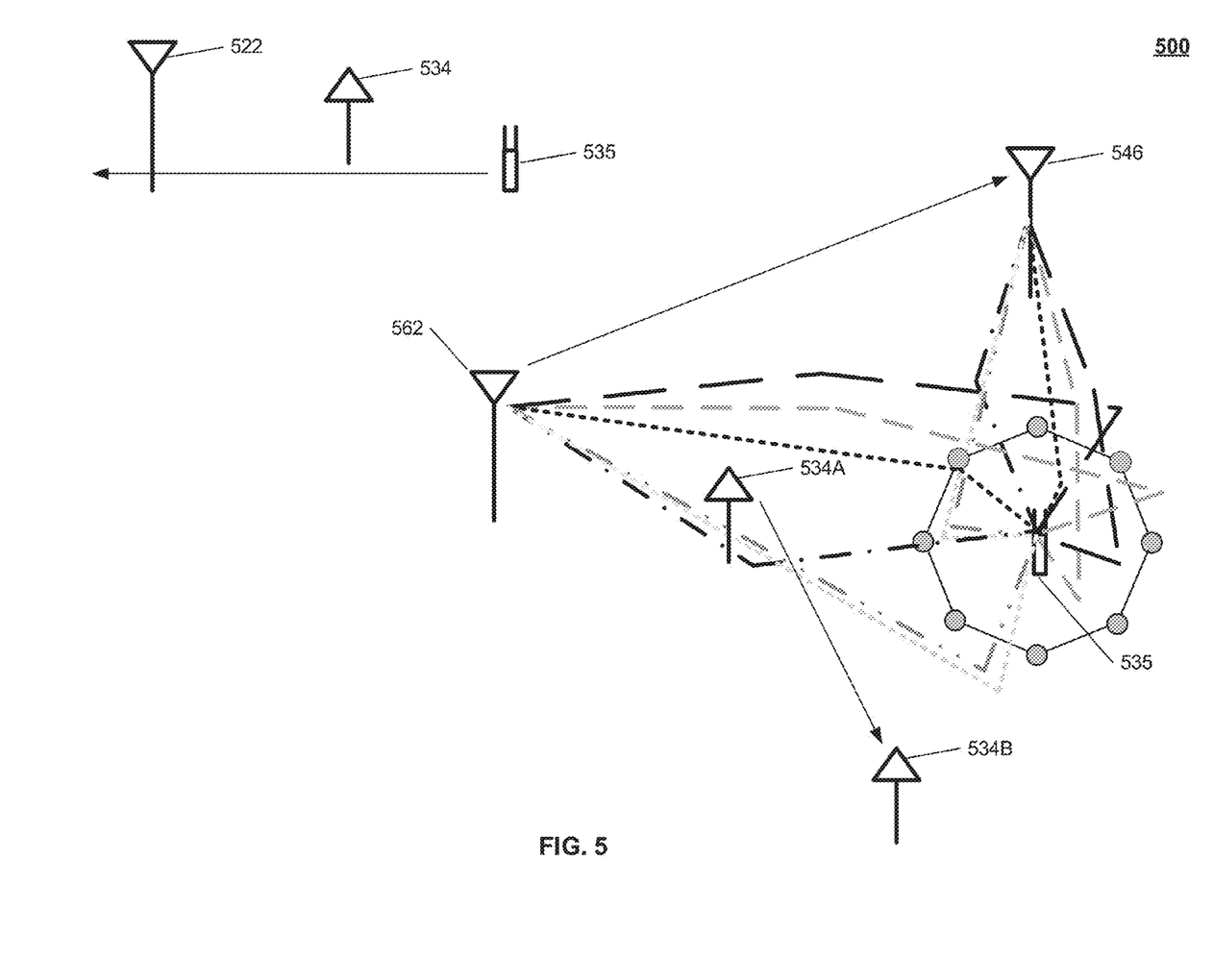
FIG. 5 shows positions of a moving DUT relative to a stationary interferer and signal source.

Three figures illustrate how antenna array 266 surrounding the DUT 235 creates conditions under which adaptation by an adaptive antenna system is tested. The figures show a physical scenario and use of antenna array 266 to emulate the physical scenario.

FIG. 3 illustrates simple movement of the mobile device 335 relative to a desired signal source antenna 322, such as a cell phone in a car driving past an antenna. In a chamber with multiple antennas 366, the position, relative powers and delays of the antenna signals shift relative to the DUT, as the emulated channel changes by the shifts from 362 to 346. Shifting the relative position changes the angle of arrival, delay and attenuation of signal components. The angles of arrival of sub-paths are likely to change dramatically, as surfaces that reflect signals appear and disappear. The relative positions also impact a Doppler shift in the multi-path components. For the line of sight component, for instance, the mobile device 335 approaching base station antenna 322 produces a blue shift of compressed wavelength while a mobile device that has passed the base station and is receding produces a red shift of elongated waves. Each of the multi-paths can be given a distinct Doppler shift, reflecting a distinct angle of arrival and given a distinct delay, reflecting a path distance covered.

Relative position of an interferer and a desired signal source is another of the changing conditions to be tested. FIG. 4 shows relative positions of a moving interferer 434 as observed by the DUT due to certain radio frequency channel conditions being emulated, with a signal source 422, 462. Both desired and interfering signals are transmitted in the chamber by one or more antennas. DUT 435 receives a changing signal as from the interferer 434 as it moves. If the emulated interferer 434 maintains a constant distance from the DUT (e.g., 434A to 434C), the signal strength can be relatively constant, subject to random variation. If the emulated interferer 434 approaches then passes the DUT (e.g., 434A to 434B), the signal strength may increase and then decrease. The emulated interferer 434 may be modeled so that the DUT observes only a single path, or it may include multi-path.

In this scenario, the angle of separation between the signal source 422, 462 and the interferer 434 will strongly impact the potential for the DUT antenna to optimize the SNR. The DUT 435 will be expected to adjust the antenna response so that the desired signal is optimized and the interference signal is nulled as much as possible. When the angle between the desired signal and the interferer is small, this becomes difficult or even impossible for the DUT 435 to accomplish. The ratio between the power of the desired and interference signals also can be varied during one or more tests.

Relative position of an interferer and a desired signal source also can be tested in a second moving DUT scenario. FIG. 5 shows positions of a moving DUT 535 relative to a stationary interferer 534 and signal source 522, 562. DUT 535 receives a changing signal as it observes the interferer 434. The paths of the DUT 535 relative to the interferer, from 534A to 534B, and relative to the signal source, from 562 to 546, illustrate a changing difference between angles of arrival of the interferer and desired signal as the system emulates DUT movement. In the chamber, the DUT 535 is stationary so the antennas surrounding the DUT emulate the relative positions of multiple (two, three, four or more) radio transmitters and multi-pathing of signals from those transmitters.

Applying the technology disclosed, one method implementation includes establishing a first test condition exposing a wireless receiver (DUT) 135 in an anechoic test chamber 132 to RF sources from multiple antennas 133. The antennas produce distinct angles of arrival to the DUT due to their spacing and, in some instances, due to power sums of adjoining antennas. The RF sources transmit a first signal that establishes the first test condition. At least one of the multiple antennas transmits multiple components of the first signal, as there are fewer antennas than there are test signal components. After the first condition is stable, the method continues with establishing a second test condition that exposes the DUT to a second signal. This change causes one or more adaptive antennas in the DUT to adapt to a difference between the first signal and the second signal. The second test condition can involve an impulse, such as the introduction of an intermittent interferer. Or, it can involve a stepped or swept change in one or more signal sources emulated by the antenna array. The method includes receiving quantified performance data regarding signal processing by the DUT at least during adaptation of the adaptive antennas to the change. The quantified performance data 126 are reported, via a communications channel to test controller 118, and correlated with the test stimulus, with the changed condition that caused the adaptive antennas to adapt.

One of the test conditions is to sweep or step the AoA of the spatial signal to evaluate the ability of the adaptive antenna to track and optimize the SNR of the desired signal. In FIG. 3, described above, the relative position of the antenna 322 and mobile device 335 changes; for instance, when a phone in a car is driven by a cellular tower. All of the paths need to be recalculated when the source position changes. The test harness measures the DUT performance during the swept or stepped change from the first antenna position condition to the second.

Another test condition is sweep or step the AoA of a spatial interferer, used to evaluate the ability of the antenna to reject the interferer when receiving a sufficient desired signal. In FIG. 4, an emulated interferer 434 moves relative to a DUT and desired signal source. As it moves, the difficulty of nulling out the interferer changes. When the difficulty increases, a DUT may adapt or shift strategies. The test harness measures the DUT performance as the interferer approaches or recedes from being aligned with the desired source.

A third test condition is sweep or step the AoA of both a desired source and a spatial interferer, as if the DUT were moving past or through two signals emanating from different locations. In FIG. 5, the DUT 535 moves relative to both the desired signal source the interferer. As the DUT moves, the difficulty of nulling out the interferer changes.

These three test conditions described above barely scratch the surface of the test conditions disclosed herein, including the many test conditions and parameters listed above. Also, "Evaluation of Devices with Adaptive Antennas Using Over the Air Techniques", bodily included in the later priority provisional application, includes experimental verification.

Figure 7:
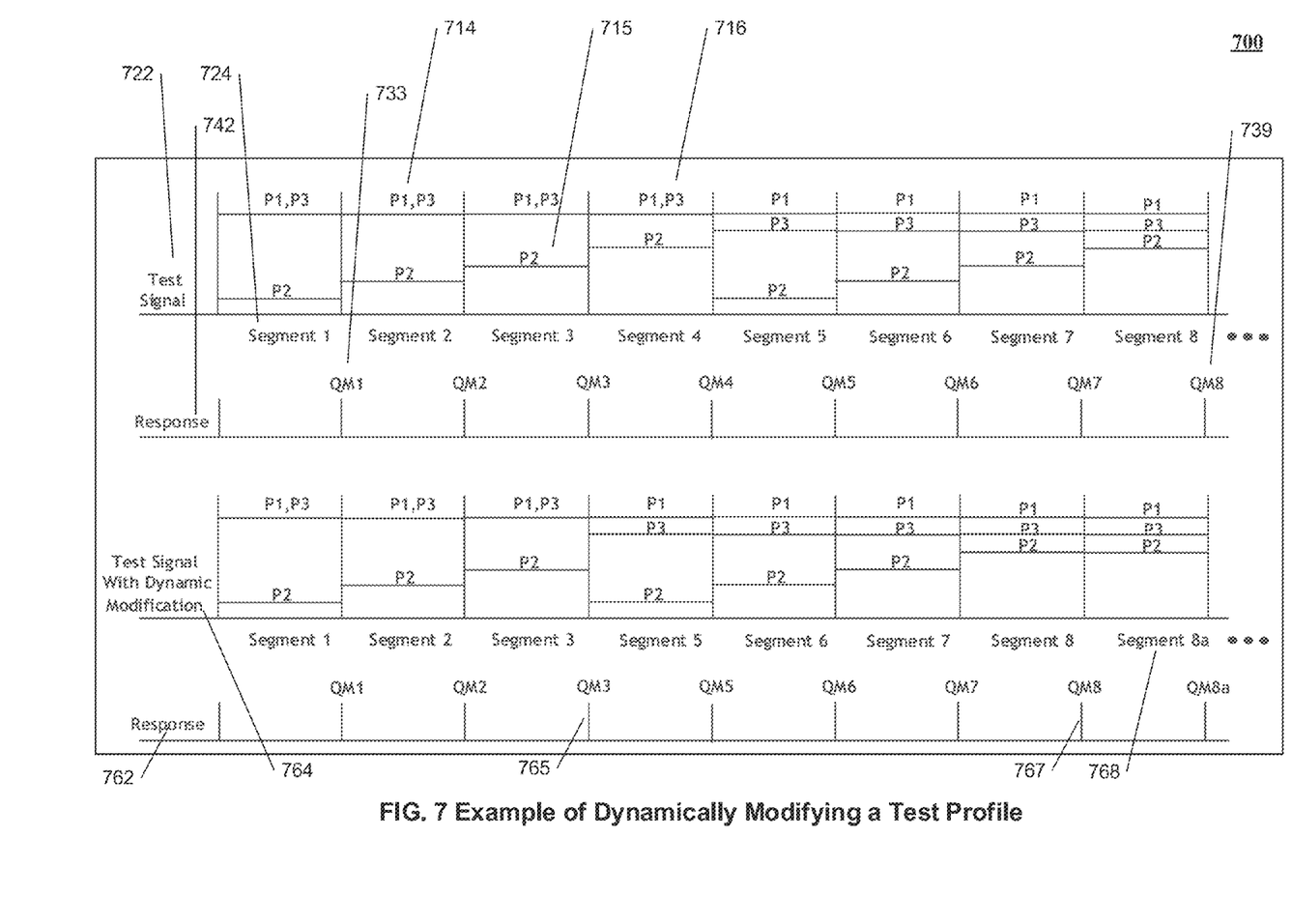
FIG. 7 depicts an example test profile and a dynamically modified test profile for a DUT.

Next we describe an example of dynamically applying a test profile based on response of the adaptive antenna system, as shown in FIG. 7. A first test signal 722 includes a sequence with a predefined signal profile with at least parameters P1 714, P2 715, and P3 716. The score or response 742 is derived from measured throughput for certain segments of the profile, each testing some aspect. Examples of parameters represented by P1, P2, and P3 include signal power level, interference power level, signal direction of arrival, interference direction of arrival, angle spread of arriving signal, angle spread of arriving interference, delay spread of signal, and delay spread of interference. When using a predefined profile as a test case, a total score leads to a pass/fail decision.

Parameters are held constant for the duration of a time segment. FIG. 7 shows eight time segments. The response 742 shows quality measures which are determined after each time segment: QM1 733 through QM8 739 for the test signal 722. Quality measures may include data throughput, number of good frames, number of failed frames, etc. Each reported quality measure is compared to an expected value during the test.

FIG. 7 also shows a test signal that has been dynamically modified 764—a second sequence which is an example of a profile that is modified. Using a dynamic profile as a test case, based on performance of a segment of the profile, the segment can be modified or expanded to fully evaluate the aspect being tested. Based on performance, segments may also be shortened, repeated, or repeated with a modification. In the example shown in FIG. 7, when QM3 765 is compared to a predetermined value, it is decided to skip the next test and segment 4 is not performed, e.g. the signal throughput has already fallen below a minimum value and segment 4 does not need to be tested. In this example, when QM8 767 is compared to a predetermined value, it is decided to repeat the same segment again to improve the quality of the measurement and segment 8a 768 is inserted into the test. That is, if the quality measure is close to the pass/fail threshold, then it is desirable to measure additional frames to improve the resolution of the test at this operating condition. Other dynamic modifications are also possible: for example, extending the range of a parameter change if the DUT is still above the minimum value defined as the threshold, or reducing the duration of a test segment—a time segment could be small and the QM could be based on several small segments. In summary, based on data received from the DUT during the first and second test conditions, a fixed profile for further testing can be utilized by automatically modifying at least one of the first and second test conditions to set third and fourth test condition parameters, then establishing third and fourth test conditions and exposing the DUT to multiple components of third and fourth signals.

In some implementations, a dynamic profile that is utilized to evaluate a first device can be saved and repeated as a fixed profile for further testing of a first or second device. In one use case example, a dynamically modified test profile can be used to measure a specific mobile device, and then that same profile can be saved, i.e. "fixed" so that it does not generate new modifications. The resulting profile can then be repeated on the same first mobile device or used to test other mobile devices.

Computer System

Figure 6:
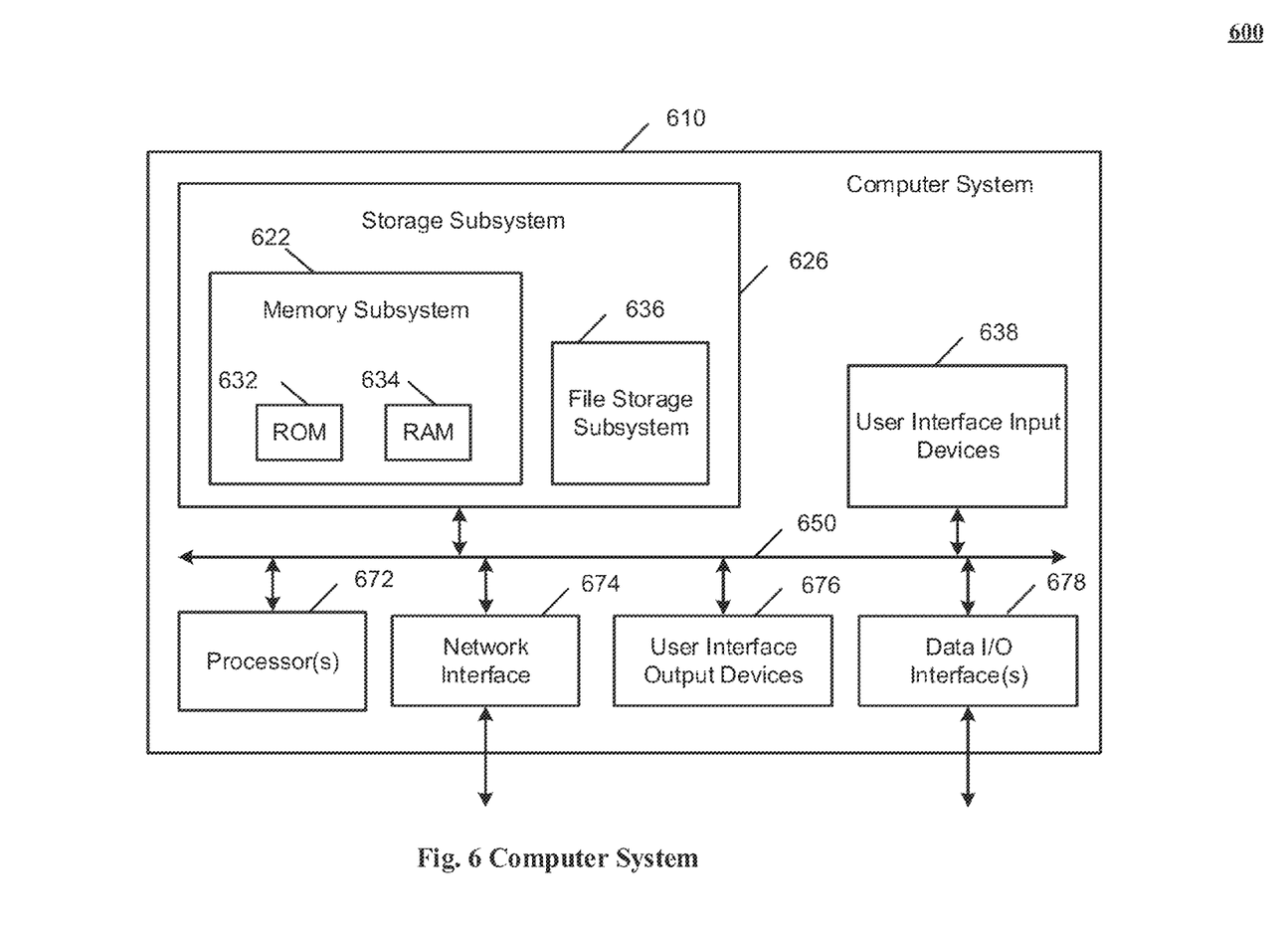
FIG. 6 is a simplified block diagram of an example computer system.

FIG. 6 is a simplified block diagram of an embodiment of a computer system 100 that can be used to control testing of adaptive antennas in a multi-probe anechoic chamber. Tests can be implemented using a computer program stored in system memory, or stored on other memory and distributed as an article of manufacture, separately from the computer system.

Computer system 610 typically includes a processor subsystem 672 which communicates with a number of peripheral devices via bus subsystem 650. These peripheral devices may include a storage subsystem 626, comprising a memory subsystem 622 and a file storage subsystem 636, user interface input devices 638, user interface output devices 678, and a network interface subsystem 676. The input and output devices allow user interaction with computer system 610 and network and channel emulators. Network interface subsystem 676 provides an interface to outside networks and devices of the system 100.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 638 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 610.

User interface output devices 678 may include a display subsystem, a printer, a fax machine, or non-visual displays such as audio output devices. The display subsystem may include a cathode ray tube (CRT), a flat panel device such as a liquid crystal display (LCD) or LED device, a projection device, or some other mechanism for creating a visible image. The display subsystem may also provide non visual display such as via audio output devices. In general, use of the term "output device" is intended to include all possible types of devices and ways to output information from computer system 610 to the user or to another machine or computer system.

The computer system further includes user interface output devices 678 for communication with the mobile device under test 130 via camera link interface 122.

Storage subsystem 626 stores the basic programming and data constructs that provide the functionality of certain embodiments of the present invention. For example, the various modules implementing the functionality of certain embodiments of the invention may be stored in a memory subsystem 626. These software modules are generally executed by processor subsystem 672.

Memory subsystem 626 typically includes a number of memories including a main random access memory (RAM) 634 for storage of instructions and data during program execution and a read only memory (ROM) 632 in which fixed instructions are stored. File storage subsystem 636 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 636. The host memory storage subsystem 626 contains, among other things, computer instructions which, when executed by the processor subsystem 672, cause the computer system to operate or perform functions as described herein. As used herein, processes and software that are said to run in or on "the host" or "the computer", execute on the processor subsystem 672 in response to computer instructions and data in the host memory subsystem 626 including any other local or remote storage for such instructions and data.

Bus subsystem 650 provides a mechanism for letting the various components and subsystems of computer system 610 communicate with each other as intended. Although bus subsystem 650 is shown schematically as a single bus, alternative embodiments of the bus subsystem may use multiple busses.

Computer system 610 itself can be of varying types including a personal computer, a portable computer, a workstation, a computer terminal, a network computer, a television, a mainframe, or any other data processing system or user device. Due to the ever changing nature of computers and networks, the description of computer system 610 depicted in FIG. 6 is intended only as a specific example for purposes of illustrating embodiments of the present invention. Many other configurations of computer system 610 are possible having more or less components than the computer system depicted in FIG. 6.

Some Particular Implementations

In one implementation, a method of testing adaptive antennas and circuitry in a wireless receiver is described. This method includes establishing a first test condition exposing an adaptive antennas system in a mobile device (referred to as a DUT, for device under test) to RF signals from multiple antennas within an anechoic chamber. Implementing the first test condition, the multiple antennas produce distinct angles of arrival to the DUT, one or more RF sources generate a first multi-component signal that establishes the first test condition; and the multiple antennas transmit the multiple components of the first signal. The method proceeds with establishing a second test condition exposing the DUT to a second multi-component signal that causes the adaptive antenna wireless receiver to adapt to a change between the first signal and the second signal, the adaption involving modification of antenna configuration, signal processing or both. A test controller or results recorder receives quantified performance data from the DUT at least during the adaptation to the change between the first signal and the second signal. This data records the adaptation. It can be received during the test or recorded by the DUT and reported after the test. The method further includes reporting the quantified performance data correlated with the change between the first signal and the second signal.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The method can further include graphically representing positions of the DUT and one or more signal sources correlated with the quantified performance data. The method can also include representing at least one interferer correlated with the quantified performance data. The graphic can animate positions of the DUT, with at least one signal source and at least one interferer correlated with the quantified performance data.

In some implementations, a test can include patterning the change between the first and second signals to emulate motion of the DUT through an emulated environment, the motion of the DUT through an emulated environment and rotation of the DUT as it moves, or the motion of the DUT through an emulated environment that includes a base station and an interferer in different positions, whereby a relative angle of arrival between signals from the base station and the interferer changes as the DUT moves. The test patterning also can pattern the change between first and second signals to emulate motion of an interferer through an emulated environment that includes a base station and the DUT, whereby ability of the DUT to adapt to separating a base station signal from the interferer signal as a relative angle of arrival changes is tested, motion of the DUT through an emulated environment at varying speeds, whereby response time of the adaptation is tested, or motion of at least the DUT at varying speeds.

The test can include a physically simulated head, hand or other phantom positioned relative to the DUT in the anechoic chamber.

Attenuation of the first and/or second signal can during the adaptation.

The first and second signals can emulate multi-pathing from one or more sources to the DUT during the adaptation.

The method can include receiving data from the DUT that reflects performance of the adaptation to the change between the first signal and the second signal, and reporting the quantified performance data correlated with the change between the first signal and the second signal. In addition, some implementations include receiving adaptation parameter data containing state or parameter information during the adaptation.

The disclosed method can further include, based on data received from the DUT during the first and second test conditions, automatically modifying at least one of the first and second test conditions to set third and fourth test condition parameters, then establishing third and fourth test conditions and exposing the DUT to multiple components of third and fourth signals.

Other implementations may include a tangible computer readable medium with instructions that, when loaded into a memory and executed on at least one processor coupled to the memory, cause the processor to control performance of any of the methods described above, or as follows. A tangible non-transitory computer readable medium does not include a transitory wave form.

Yet another implementation of the disclosed technology includes a system of testing adaptive antennas and circuitry in a wireless device under test (DUT), comprising a test controller, a network emulator and a channel emulator coupled to the test controller, multiple antennas within an anechoic chamber, coupled to at least the channel emulator, and a communications channel that couples the test controller to the DUT. The test controller is adapted to set parameters of and initiate signals from the network emulator and the channel emulator to establish a first test condition exposing an adaptive antennas system in the DUT to RF signals from the multiple antennas within the anechoic chamber, wherein the multiple antennas produce distinct angles of arrival to the DUT; one or more RF sources generate multiple components of a first signal that establishes the first test condition; and the multiple antennas transmit the multiple components of the first signal. The test controller is further adapted to set parameters of and initiate signals from the network emulator and the channel emulator to establish a second test condition exposing the DUT to multiple components of a second signal that causes the adaptive antenna wireless receiver to adapt to a change between the first signal and the second signal, the adaption involving modification of antenna configuration, signal processing or both within the DUT. The test controller is further adapted to receive data from the DUT quantifying performance of the adaptive antennas system during the change between the first signal and the second signal and report the quantified performance data correlated with the change between the first signal and the second signal.

This system and other implementations of the technology disclosed can include one or more of the features described in connection with the methods disclosed. In the interest of conciseness, the combinations of features disclosed in this application are not individually enumerated and are not repeated with each base set of features. The reader will understand how features identified in this section can readily be combined with sets of base features identified as implementations.

I claim as follows:

1. A method of testing adaptive antennas and circuitry in a wireless receiver, including:
   establishing a first test condition exposing an adaptive antennas system in a mobile device (referred to as a DUT, for device under test) to RF signals from multiple antennas within an anechoic chamber, wherein:
     the multiple antennas produce distinct angles of arrival to the DUT;
     one or more RF sources generate multiple components of a first signal that establishes the first test condition; and
     the multiple antennas transmit the multiple components of the first signal;
   establishing a second test condition exposing the DUT to multiple components of a second signal that causes the adaptive antennas system in the mobile device to adapt to a change between the first signal and the second signal, the adaption involving modification of antenna configuration, signal processing or both within the DUT;
   receiving data from the DUT, quantifying performance of the adaptive antennas system during the change between the first signal and the second signal; and
   reporting the quantified performance data correlated with the change between the first signal and the second signal.

2. The method of claim 1, further including graphically representing positions of the DUT and one or more signal sources correlated with the quantified performance data.

3. The method of claim 1, further including graphically representing positions of the DUT, at least one signal source and at least one interferer correlated with the quantified performance data.

4. The method of claim 1, further including graphically animating positions of the DUT, at least one signal source and at least one interferer correlated with the quantified performance data.

5. The method of claim 1, further including patterning the change between the first signal and the second signal to emulate motion of the DUT through an emulated environment and rotation of the DUT as it moves.

6. The method of claim 1, further including patterning the change between the first signal and the second signal to emulate motion of an interferer through an emulated environment that includes a base station and the DUT, whereby ability of the DUT to adapt to separating a base station signal from the interferer as a relative angle of arrival changes is tested.

7. The method of claim 1, further including patterning the change between the first signal and the second signal to emulate motion of at least the DUT at varying speeds through an emulated environment that includes a base station and an interferer, whereby response time of the adaptation is tested.

8. The method of claim 1, further including varying attenuation of the first and second signal during the adaptation.

9. The method of claim 1, further including patterning the first signal and the second signal to emulate multi-pathing from one or more sources to the DUT during the adaptation.

10. The method of claim 1, further including:
   receiving adaptation parameter data from the DUT, at least during the adaptation to the change between the first signal and the second signal; and
   reporting the quantified performance data correlated with the change between the first signal and the second signal.

11. The method of claim 1, further including, based on data received from the DUT during the first and second test conditions, automatically modifying at least one of the first and second test conditions to set third and fourth test condition parameters, then establishing third and fourth test conditions and exposing the DUT to multiple components of third and fourth signals.

12. A non-transitory tangible computer readable medium with instructions that, when loaded into a memory and executed on at least one processor coupled to the memory, cause the processor to carry out a method, including:
    establishing a first test condition exposing an adaptive antennas system in a mobile device (referred to as a DUT, for device under test) to RF signals from multiple antennas within an anechoic chamber, wherein:
        the multiple antennas produce distinct angles of arrival to the DUT;
        one or more RF sources generate multiple components of a first signal that establishes the first test condition; and
        the multiple antennas transmit the multiple components of the first signal;
    establishing a second test condition exposing the DUT to multiple components of a second signal that causes the adaptive antennas system in the mobile device to adapt to a change between the first signal and the second signal, the adaption involving modification of antenna configuration, signal processing or both within the DUT;
    receiving data from the DUT, quantifying performance of the adaptive antennas system during the change between the first signal and the second signal; and
    reporting the quantified performance data correlated with the change between the first signal and the second signal.

13. The non-transitory tangible computer readable medium of claim 12, further including graphically representing positions of the DUT and one or more signal sources correlated with the quantified performance data.

14. The non-transitory tangible computer readable medium of claim 12, further including graphically representing positions of the DUT and at least one signal source and at least one interferer correlated with the quantified performance data.

15. The non-transitory tangible computer readable medium of claim 12, further including patterning the change between the first signal and the second signal to emulate motion of the DUT through an emulated environment.

16. The non-transitory tangible computer readable medium of claim 12, further including patterning the change between the first signal and the second signal to emulate motion of the DUT through an emulated environment and rotation of the DUT as it moves.

17. A system of testing adaptive antennas and circuitry in a wireless device under test (DUT), the system comprising:
    a test controller;
    a network emulator and a channel emulator coupled to the test controller;
    multiple antennas within an anechoic chamber, coupled to at least the channel emulator;
    a communications channel that couples the test controller to the DUT;
    the test controller adapted to set parameters of and initiate signals from the network emulator and the channel emulator to establish a first test condition exposing an adaptive antennas system in the DUT to RF signals from the multiple antennas within the anechoic chamber, wherein:
        the multiple antennas produce distinct angles of arrival to the DUT;
        one or more RF sources generate multiple components of a first signal that establishes the first test condition; and
        the multiple antennas transmit the multiple components of the first signal;
    the test controller further adapted to set parameters of and initiate signals from the network emulator and the channel emulator to establish a second test condition exposing the DUT to multiple components of a second signal that causes the adaptive antennas system in the mobile device to adapt to a change between the first signal and the second signal, the adaption involving modification of antenna configuration, signal processing or both within the DUT; and
    the test controller further adapted to receive data, from the DUT, quantifying performance of the adaptive antennas system during the change between the first signal and the second signal and report the quantified performance data correlated with the change between the first signal and the second signal.

18. The system of claim 17, further including graphically representing positions of the DUT and one or more signal sources correlated with the quantified performance data.

19. The system of claim 17, further including graphically representing positions of the DUT and at least one signal source and at least one interferer correlated with the quantified performance data.

20. The system of claim 17, further including patterning the change between the first signal and the second signal to emulate motion of the DUT through an emulated environment that includes a base station and an interferer in different positions, whereby a relative angle of arrival between signals from the base station and the interferer changes as the DUT moves.

21. The system of claim 17, further including patterning the change between the first signal and the second signal to emulate motion of the DUT through an emulated environment at varying speeds, whereby response time of the adaptation is tested.

22. The system of claim 17, further including patterning the change between the first signal and the second signal to emulate motion of at least the DUT at varying speeds through an emulated environment that includes a base station and an interferer, whereby response time of the adaptation is tested.

23. The system of claim 17, further including a physically simulated head, hand or other phantom positioned relative to the DUT in the anechoic chamber.

24. The system of claim 17, further including varying attenuation of the first and second signal during the adaptation.

* * * * *